Dec. 10, 1957      R. W. FRENCH      2,816,180
PROTECTIVE CIRCUIT
Filed Sept. 13, 1956
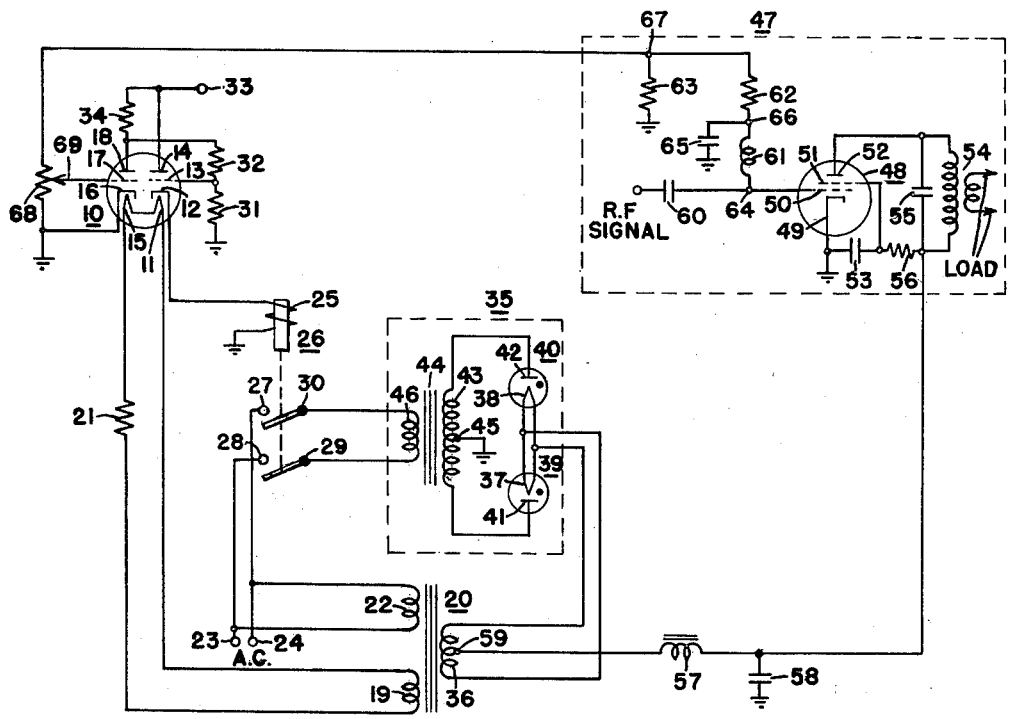
INVENTOR:
RICHARD W. FRENCH,
BY *Robert J. Steinmeyer*
HIS ATTORNEY.

2,816,180
Patented Dec. 10, 1957

2,816,180

PROTECTIVE CIRCUIT

Richard W. French, Liverpool, N. Y., assignor to General Electric Company, a corporation of New York Application September 13, 1956, Serial No. 609,717

6 Claims. (Cl. 179—171)

This invention relates to protective circuits and more particularly to a protective circuit capable of responding to more than one condition and protecting more than one device.

Two essential elements in a radio frequency transmitting circuit are the transmitter or output tube and the rectifier tube for providing D. C. voltage to the transmitter tube. It is necessary, in order to protect both of these tubes from deleterious effects, to provide for removal of the voltages applied thereto under certain conditions. For instance, if the transmitter tube loses its negative grid bias, which limits emission from its cathode and the resulting tube current, a sufficiently large current may flow in the transmitter tube in order to cause severe damage. If power is applied to the rectifier tubes, on the other hand, before the filaments of the rectifiers have had sufficient time to warm up, the rectifier tubes may be severely damaged.

It is old in the art to delay the application of plate voltage to a rectifier circuit in order to avoid damage to the rectifier tube due to applying the voltage before the filaments have had the proper time to warm up. In a transmitting circuit employing the transmitting and rectifier tubes described above, it is desirable to inter-relate the functions of removing the power from the rectifier tubes and the transmitting tubes. It is also desirable to minimize the number of components necessary to provide these control functions. Accordingly, it is an object of my invention to provide a compact protective circuit to protect both the rectifier tubes and the transmitter tubes in the final radio frequency stages of a transmitting circuit.

Another object of my invention is to provide a selected time delay for controlling the application of voltage to the rectifier tube circuit in a transmitter.

A further object of my invention is to provide a circuit which will remove the plate voltage from the final R. F. stage of a transmitter in the event that the grid should lose its negative grid bias or swing sufficiently positive.

A still further object of my invention is to employ a variable means to set the level of grid bias of the final R. F. stage at which the plate voltage will be removed.

In carrying out my invention in one form thereof I employ a control circuit comprising a vacuum tube having a switching means with an actuating coil connected in series with its cathode circuit in order to protect both the rectifier tubes and transmitting or output tubes in an R. F. transmitter circuit in which the rectifier tubes provide D. C. plate voltage to the transmitting tubes. An impedance is placed in series in the filament circuit of the vacuum tube in order to provide a time delay in the heating up of the filament by initially limiting the available filament power. After the filament has reached its required operating temperature the vacuum tube will conduct and upon reaching a certain level of conduction the switching means in the cathode circuit of the vacuum tube is actuated. During this time the filaments of the rectifier tube circuit, which are connected to the same filament transformer as the vacuum tube, have also been warming up and are ready to receive plate voltage at the time of actuation of the switching means. The grid circuit of the transmitting tube is connected back to the grid of the vacuum tube in order to cut it off if the bias of the transmitting tube should go far enough in the positive direction to cause damage to the transmitting tube. This deactuates the switching means and removes the plate voltage from the rectifier tubes removing power from the final R. F. stage in order to prevent damage to the transmitting tube because of loss of bias. Thus, the control circuit provides both a time delay as a safeguard for the rectifiers and a positive cut-off to protect against loss of negative grid bias of the transmitting tube.

The novel features which I believe to be characteristic of my invention are set forth with particularity in the appended claims. My invention itself, however, together with further objects and advantages thereof can best be understood by reference to the following description taken in connection with the accompanying drawing in which I have illustrated a circuit diagram employing one form of my invention.

Referring now to the drawing I have illustrated a twin-triode vacuum tube 10 used in the control portion of the circuit of my invention and having a filament 11, a cathode 12, a grid 13 and a plate 14 on its right side, and a filament 15, a cathode 16, a grid 17 and a plate 18 on its left side. Filaments 11 and 15 are connected to winding 19 of a filament transformer 20 in series with an impedance 21. Filament transformer 20 is supplied at primary winding 22 from a source of alternating current (not illustrated) applied to terminals 23 and 24. Cathode 12 of vacuum tube 10 has energizing coil 25 of a switching means or relay 26 connected in series circuit with it to ground. Relay 26, includes, in addition to coil 25, movable contacts 27 and 28, and stationary contacts 29 and 30. The grid 13 of vacuum tube 10 is connected to ground through a resistor 31 and to plate 18 of the left side of vacuum tube 10 through a resistor 32. Plate 14 of vacuum tube 10 is connected to a source of positive potential (illustrated by the symbol B+) at terminal 33 and plate 18 of vacuum tube 10 is also connected to the source of positive potential at terminal 33 through a series resistor 34.

The control circuit of tube 10 and relay 26 switches power to a high voltage rectifier circuit, indicated generally by the numeral 35, which is connected from winding 36 on filament transformer 20 to parallel-connected filaments, 37 and 38 of rectifier tubes 39 and 40. Plates 41 and 42 of rectifier tubes 39 and 40 are connected back-to-back through a secondary winding 43 on an input transformer 44 having a secondary center tap 45 connected to ground. The primary 46 of transformer 44 is connected to movable contacts 27 and 28 of relay 26. Stationary contacts 29 and 30 of relay 26 are connected to the terminals 23 and 24, or to the source of A. C. potential.

The rectifier circuit 35 supplies D. C. to a final radio frequency transmitting stage 47 which consists of an output tube 48 having a cathode 49, control grid 50, screen grid 51 and a plate 52. Cathode 49 is connected to ground and to screen grid 51 through a capacitor 53. The load circuit is connected to tube 48 through a transformer 54 which is paralleled by variable capacitor 55 and connected across plate 52 and to screen grid 51 through a resistor 56 which is connected in series with screen grid 51. The high voltage from rectifier circuit 35 is connected to tube 48 between resistor 56 and transformer 54 through a filter circuit comprising a series inductor 57 and a parallel capacitor 58 going to ground. The connection is made from center tap 59 of winding 36, the rectifier filament winding on transformer 20.

In order to modulate output tube 48 an R. F. signal is fed to control grid 50 through a coupling capacitor 60. A control grid self biasing resistance is connected between the capacitor 60 and control grid 50 and consists of the inductor 61, the resistor 62 and the resistor 63 connected in series to ground from the point 64 between capacitor 60 and control grid 50, and a capacitor 65 connected to ground from a point 66 between inductor 61 and resistor 62. A tap is taken from the control grid self biasing resistance at the point 67 between resistor 62 and resistor 63. The point 67 is connected through a potentiometer 68 to ground. This potentiometer 68 is connected in the grid circuit of the left side of vacuum tube 10, the tap 69 on potentiometer 68 being connected to the grid 17 and cathode 16 being connected to ground.

Typical values of the above identified components for one practical embodiment of my invention are as follows:

| | |
|---|---|
| Tube 10 | 12 AT7. |
| Filament transformer 20 | 5 v. at 10 A. |
| Impedance 21 | 12 ohms. |
| Relay coil 25 | 10,000 ohms. |
| Resistor 31 | 510,000 ohms. |
| Impedance 32 | 1,000,000 ohms. |
| B+ at point 33 | 300 volts. |
| Resistor 34 | 510,000 ohms. |
| Rectifier tubes 39 and 40 | 866A's |
| Transformer 44 | Secondary winding: 5000 volts, center-tapped. |
| Tube 48 | 4–250A. |
| Capacitor 53 | .001 μfd. |
| Transformer 54 | Air Core Radio-frequency transformer. |
| Capacitor 55 | Variable capacitor, 5 to 100 μμfd. |
| Resistor 56 | 20,000 ohms, 50 watts. |
| Inductor 57 | 20 henries. |
| Capacitor 58 | 4 μfd. |
| Capacitor 60 | 1000 μμfd. |
| Inductor 61 | 1 m H. |
| Resistor 62 | 24,000 ohms. |
| Resistor 63 | 680 ohms. |
| Capacitor 65 | .01 μfd. |
| Potentiometer 68 | 50,000 ohms. |

The operation of the circuit is as follows:

When the transmitter is turned on an alternating current potential is applied to the terminals 23 and 24. This potential is transformed through the filament transformer 20 in order to heat up the filaments 11 and 15 of vacuum tube 10 and the filaments 37 and 38 of rectifier tubes 39 and 40. Impedance 21 in series with filaments 11 and 15 causes a time delay in the heating up of the filament 11 by initially limiting the available filament power, and a corresponding delay in the conduction of the vacuum tube 10. This delays the application of voltage to the coil 25 of relay 26. After the filaments 11 and 15 have heated up, sufficient current flows in the circuit of cathode 12 of vacuum tube 10 in order to actuate the relay 26 closing contacts 27 and 30 and 29 and 28 and applying voltage to transformer 44 and to rectifier tubes 39 and 40. The rectified voltage is then fed to the tube 48 in the final R. F. stage. In addition to the time delay due to impedance 21 in the filament circuit of vacuum tube 10 an additional control is exercised on the conduction of tube 10 by means of the potentiometer 68 in the grid circuit of grid 17 on the left side of tube 10. Potentiometer 68 is fed from a tap 67 on the grid self biasing resistance of tube 48. In the event that the grid drive should be lost or become dangerously low and control grid 50 should swing less negative, causing an increase in conduction on the left hand side of vacuum tube 10, grid 13 on the right hand side of vacuum tube 10 will swing negative reducing the amount of conduction on the right hand side of tube 10 and causing the relay 26 to drop out, removing the A. C. potential from the transformer 44 and the rectifier tube circuit 35 and removing the high voltage rectifier circuit output from the tube 48.

Thus it can be seen that the actuation of relay 26 depends upon both the time delay in the heating of filament 11 due to the impedance 21 and the application of the proper potential to the potentiometer 68. In the event that either of these conditions is not satisfied relay 26 will open removing the potential from the rectifier circuit 35 as well as from the circuit of the tube 48.

It will be obvious to anyone skilled in the art that my invention is readily adaptable to any application which would require an event or action utilizing electrical power to occur after a delay in time, provided that some other action which can produce a given amplitude voltage is required before the first action is needed. As such, this might be thought of as a time delay-voltage coincidence circuit.

While I have shown a particular embodiment of my invention it will be understood of course that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. In combination, a vacuum tube having at least an anode, a cathode and a grid, an output tube having a control grid, switching means connected in the cathode circuit of said vacuum tube for applying voltage to said output tube at a certain level of conduction of said vacuum tube, means connecting the grid of said output tube to the grid of said vacuum tube which will cut off said vacuum tube when said grid of said output tube reaches a certain voltage level causing said switching means to remove power from said output tube whereby said output tube is not damaged due to loss of negative grid bias.

2. In combination, a vacuum tube having at least an anode, a cathode and a grid, a rectifier tube circuit, switching means connected in the circuit of said cathode for applying A. C. voltage to said rectifier tube circuit at a certain level of conduction of said vacuum tube, an output tube supplied by said rectified tube circuit, said output tube having a control grid, means connecting said control grid of said output tube to the grid of said vacuum tube which will cut off said vacuum tube when said control grid of said output tube reaches a certain voltage level causing said switching means to remove power from said output tube whereby said output tube is not damaged due to loss of negative grid bias.

3. In combination, a vacuum tube having at least an anode, a cathode, a grid and a filament, a rectifier tube circuit, switching means connected in the circuit of said cathode for applying A. C. voltage to said rectifier tube circuit at a certain level of conduction of said vacuum tube, means connected in the filament circuit of said vacuum tube to delay conduction after actuation, an output tube supplied by said rectifier tube circuit, said output tube having a control grid, means connecting the control grid of said output tube to the grid of said vacuum tube which will cut off said vacuum tube when said control grid of said output tube reaches a certain voltage level causing said switching means to remove power from said rectifier tube whereby said rectifier tube and said output tube are not damaged due to loss of negative grid bias on said output tube.

4. In combination, a vacuum tube having at least an anode, a cathode, a grid, and a filament, a rectifier tube circuit, a filament supply common to said filament of said vacuum tube and the filaments of said rectifier tube circuit, switching means connected in the cathode circuit of said vacuum tube for applying A. C. voltage to said rectifier tube circuit at a certain level of conduction of said vacuum tube, means in the filament circuit of said vacuum tube to delay conduction after actuation in order to allow the filaments of said rectifier circuit to heat up before application of A. C. voltage to said rectifier circuit, an output tube supplied by said rectifier circuit, said output tube having a control grid, means connecting the control grid of said output tube to the grid of said vacuum tube which will cut off said vacuum tube when said control grid of said output tube reaches a certain voltage level causing said switching means to remove power from said output tube whereby said output tube is not damaged due to loss of negative grid bias.

5. The combination of claim 4 in which said means connecting the control grid of said output tube to the grid of said vacuum tube comprises a tap on the grid self biasing resistance of said output tube for deriving a control voltage, a second vacuum tube plate, grid and cathode, said tap being connected to said second vacuum tube grid, and an impedance connected between said second vacuum tube plate and the grid of said first vacuum tube.

6. The combination of claim 5 in which said tap is connected to said second vacuum tube grid through a potentiometer, said potentiometer being capable of setting the actuation points of said switching means.

No references cited.